(12) United States Patent
Mao et al.

(10) Patent No.: US 10,321,240 B2
(45) Date of Patent: *Jun. 11, 2019

(54) RECEIVER

(71) Applicant: GOERTEK INC., WeiFang (CN)

(72) Inventors: Linjin Mao, WeiFang (CN); Gang Chen, WeiFang (CN)

(73) Assignee: GOERTEK INC., Weifang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/745,071

(22) PCT Filed: Nov. 16, 2015

(86) PCT No.: PCT/CN2015/094684
§ 371 (c)(1),
(2) Date: Jan. 15, 2018

(87) PCT Pub. No.: WO2017/045261
PCT Pub. Date: Mar. 23, 2017

(65) Prior Publication Data
US 2018/0359569 A1    Dec. 13, 2018

(30) Foreign Application Priority Data

Sep. 15, 2015  (CN) ..................... 2015 2 0712320 U

(51) Int. Cl.
*H04R 9/00* (2006.01)
*H04R 9/10* (2006.01)
(Continued)

(52) U.S. Cl.
CPC ................ *H04R 9/10* (2013.01); *H04M 1/03* (2013.01); *H04R 1/02* (2013.01); *H04R 9/02* (2013.01);
(Continued)

(58) Field of Classification Search
CPC .... H04R 1/06; H04R 2499/11; H04R 31/006; H04R 2400/11
See application file for complete search history.

(56) References Cited

U.S. PATENT DOCUMENTS

2003/0077945 A1* 4/2003 Hashiba ................... H04R 1/06
439/660
2004/0166701 A1* 8/2004 Sasaki ................ H01R 13/2407
439/66
(Continued)

FOREIGN PATENT DOCUMENTS

CN       2632952 Y      8/2004
CN    202773072 U   *  9/2012
(Continued)

OTHER PUBLICATIONS

International Search Report for PCT/CN2015/094684 filed on Nov. 16, 2015.

*Primary Examiner* — Matthew E Eason

(57) ABSTRACT

A receiver comprises a peripheral housing, and a magnet circuit system and a vibrating system. The vibrating system comprises a vibrating diaphragm and a voice coil. The periphery housing comprises a first and second housing matched with each other, which are provided with electrical connection structures conductive with each other. A sidewall of the first housing is provided with a first elastic piece including one end welded with a spring electrically connected to an external circuit and another end exposed at the outer side of the sidewall of the first housing. A sidewall of the second housing is provided with a second elastic piece including one end electrically connected with a lead wire of the voice coil and another end exposed at the outer side of the sidewall of the second housing and welded and fixed with a portion of the first elastic piece exposed to the outer side.

10 Claims, 2 Drawing Sheets

(51) Int. Cl.
*H04R 9/02* (2006.01)
*H04R 9/08* (2006.01)
*H04R 9/06* (2006.01)
*H04R 25/00* (2006.01)
*H04R 31/00* (2006.01)
*H04M 1/03* (2006.01)
*H04R 1/02* (2006.01)
*H04R 11/06* (2006.01)
*H04R 1/10* (2006.01)

(52) U.S. Cl.
CPC ............... *H04R 9/06* (2013.01); *H04R 9/08* (2013.01); *H04R 11/06* (2013.01); *H04R 25/604* (2013.01); *H04R 31/006* (2013.01); *H04R 1/021* (2013.01); *H04R 1/10* (2013.01); *H04R 25/65* (2013.01); *H04R 2499/11* (2013.01)

(56) References Cited

U.S. PATENT DOCUMENTS

| | | | |
|---|---|---|---|
| 2006/0098838 A1* | 5/2006 | Yoo | H04R 1/06 381/398 |
| 2006/0120553 A1* | 6/2006 | Saito | H04R 1/06 381/398 |
| 2009/0123017 A1* | 5/2009 | Suzuki | H04R 1/021 381/386 |
| 2015/0098593 A1* | 4/2015 | Yueh | H04R 17/02 381/190 |
| 2017/0034629 A1* | 2/2017 | Mao | H04R 9/045 |
| 2018/0249253 A1* | 8/2018 | Mao | H04R 9/02 |

FOREIGN PATENT DOCUMENTS

| | | |
|---|---|---|
| CN | 103581809 A | 2/2014 |
| JP | 3454720 B2 | 10/2003 |

* cited by examiner

US 10,321,240 B2

RECEIVER

CROSS-REFERENCE TO RELATED APPLICATIONS

The present specification is a U.S. National Stage of International Patent Application No. PCT/CN2015/094684 filed Nov. 16, 2015, which claims priority to and the benefit of Chinese Patent Application No. 201520712320.X filed in the Chinese Intellectual Property Office on Sep. 15, 2015, the entire contents of which are incorporated herein by reference.

TECHNICAL FIELD

The present invention relates to an electroacoustic field, and more particularly, to a receiver.

BACKGROUND ART

A receiver is a device that can realize an electroacoustic energy conversion, which is widely used in electronic terminal devices such as mobile phones and telephones. The traditional receiver structure generally includes a magnetic circuit system, a vibrating system, and an outer housing for accommodating the magnetic circuit system and the vibrating system. In order to realize the electrical connection between the receiver and a terminal electronic device, a middle housing is usually integrated with an elastic piece by injection molding, and the elastic piece is electrically connected with a lead wire of a voice coil inside the receiver, while the outer side needs to be conducted through a spring structure. In the prior art, one end of the spring is usually soldered on the elastic piece of the middle housing, and another end is connected to the terminal electronic device, thereby realizing the transmission of the external current signal to the inside of the receiver.

However, as described above, since the spring is welded to the elastic piece of the middle housing, a product needs to be laterally extended on the basis of the dimension of the existing vibrating system to form a space for the spring assembly, thus increasing the length dimension of the product, failing to satisfy the restrictive requirement for a lateral assembly space of the terminal device, while the middle housing is located in the middle layer of the receiver product, and it is difficult to guide the spring to the vertical position of the vibrating system due to the restrictive requirement for the product assembly. Therefore, it is necessary to provide a new design approach of the electrical connection structure of the receiver so that the spring can be guided to the vertical position of the vibrating system without affecting the assembly and lateral space of the product.

SUMMARY OF THE INVENTION

The technical problem to be solved by the present invention is to provide a receiver, which can guide a spring for connecting an external circuit to the top of a vibrating system without affecting an assembly of a product with a terminal device and a lateral space of the product by improving the position of the electrical connection structure thereof.

In order to achieve the above object, the present invention adopts the following technical solutions: provided is a receiver, comprising a peripheral housing, and a magnetic circuit system and a vibrating system which are accommodated in the peripheral housing, wherein the vibrating system comprises a vibrating diaphragm and a voice coil; the periphery housing comprises a first housing and a second housing matched with each other; the first housing and the second housing are provided with electrical connection structures conductive with each other, wherein a first elastic piece is provided on a sidewall of the first housing; one end of the first elastic piece is welded with a spring electrically connected with an external circuit, and another end is exposed at the outer side of the sidewall of the first housing; a second elastic piece is provided on a sidewall of the second housing; one end of the second elastic piece is electrically connected with a lead wire of the voice coil; and another end of the second elastic piece is exposed at the outer side of the sidewall of the second housing and is welded and fixed with a portion of the first elastic piece exposed at the outer side.

As a preferred embodiment, the vibrating system is accommodated in a cavity defined by the second housing; and the spring is coupled to the first housing and located above the vibrating system.

As a preferred embodiment, the first elastic piece comprises a first connecting end welded and fixed with the spring and a first exposed end exposed at an outer side of a sidewall of the first elastic piece; and the second elastic piece comprises a second connecting end electrically connected with the lead wire of the voice coil and a second exposed end exposed at an outer side of a sidewall of the second elastic piece.

As a preferred embodiment, a bonding wire is provided on the first exposed end; and the first exposed end and the second exposed end are welded and conducted by the bonding wire.

As a preferred embodiment, the first exposed end of the first elastic piece and the second exposed end of the second elastic piece extend horizontally to the outer side of the sidewall of the first housing and the outer side of the sidewall of the second housing of the receiver.

As a preferred embodiment, the first exposed end is bent in the direction toward the second housing and tightly attached to the sidewall of the first housing; and the second exposed end is correspondingly bent in the direction toward the first housing and lapped with the first exposed end.

As a preferred embodiment, the first exposed end and the second exposed end are fixed by laser-welding and are conductive with each other.

As a preferred embodiment, a bonding pad is provided on the second elastic piece; and the lead wire of the voice coil is spot-welded and fixed to the bonding pad.

As a preferred embodiment, the first elastic piece and the second elastic piece are disposed on the sidewalls of the first housing and the second housing at a same end.

As a preferred embodiment, a third housing and a hearing aid voice coil are further comprised, wherein the third housing is matched with the second housing and coupled at a bottom of the second housing; a central position of the vibrating diaphragm is coupled with a reinforcing part; a lower side of the vibrating diaphragm is coupled with a metal ring supporting the vibrating diaphragm; and the magnetic circuit system comprises a yoke, and a magnet and a washer which are fixed in the yoke.

As compared with the prior art, in the receiver of the present invention, an elastic piece structure (the first elastic piece) is added on a first housing, one end of the first elastic piece is welded with a spring, another end of the first elastic piece is exposed at an outer side of a sidewall of the first housing, one end of a second elastic piece disposed on a second housing is welded with the lead wire of the voice coil, another end of the second elastic piece is exposed at an outer side of a sidewall of the second housing, and the portions of the first elastic piece and the second elastic piece exposed at the outer side is welded and conducted by the bonding wire. Such a design of the electrical connection structure allows the spring to be transferred from the lateral position of the product to the top of the vibrating system, which can reduce the lateral dimension of the product without reducing the lateral dimension of the vibrating system (without impairing the performance of the product), satisfy the restrictive requirement for the lateral dimension of the product when assembled with the terminal electronic device.

REFERENCE NUMBER

1: first housing;
2: second housing;
3: first elastic piece;
31: first connecting end;
32: first exposed end;
320: bonding wire;
4: second elastic piece;
40: bonding pad;
41: second connecting end;
42: second exposed end;
5: spring;
6: voice coil;
61: voice coil lead;
7: vibrating diaphragm;
8: third housing;
9: reinforcing part;
10: metal ring;
11: yoke;
12: magnet;
13: washer;
14: hearing aid voice coil.

DETAILED DESCRIPTION OF THE EMBODIMENTS

The present invention will be described in more detail with reference to the accompanying drawings:

Example 1

Figure 1:
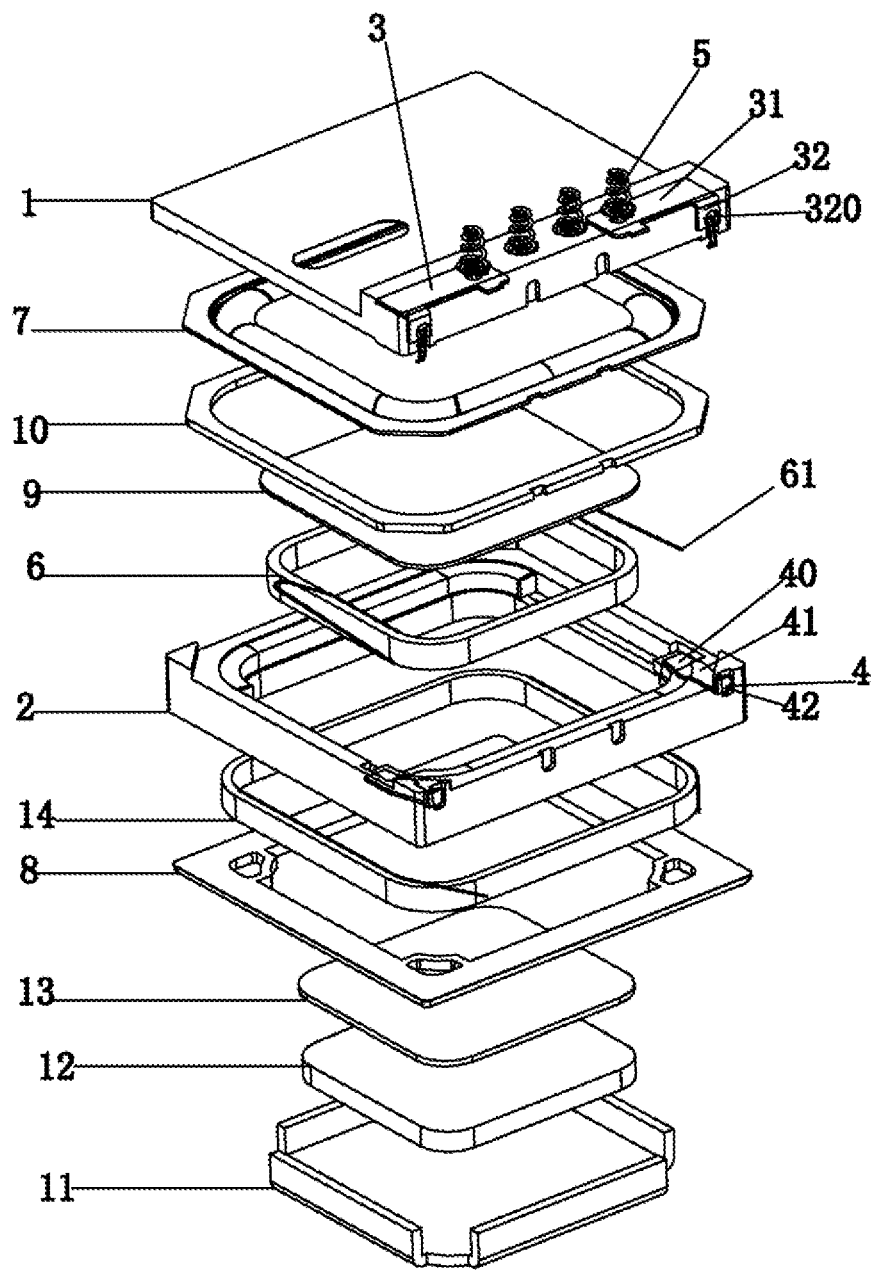
FIG. 1 is an exploded view of the structure of the receiver of the present invention.
Figure 2:
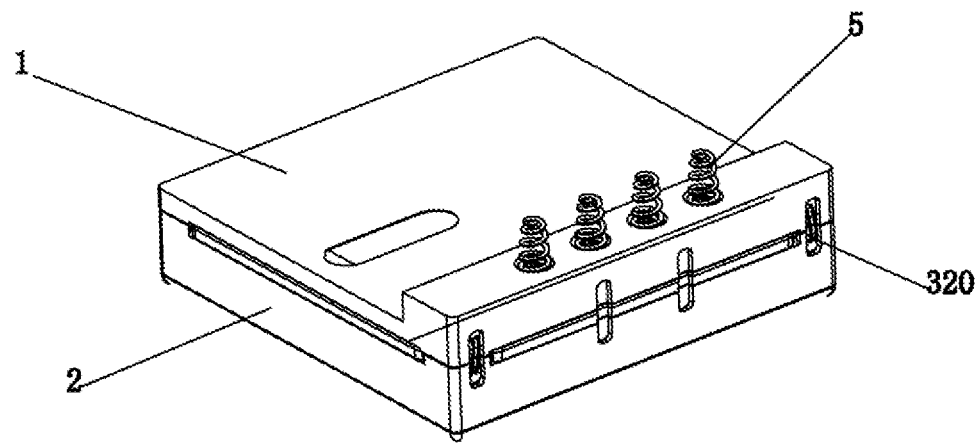
FIG. 2 is a perspective view of the structure of the receiver according to Example 1 of the present invention.

Referring to FIG. 1, the receiver of the present invention comprises a peripheral housing, and in particular, the peripheral housing includes a first housing 1, a second housing 2 and a third housing 8 matched with each other from top to bottom, which together form a cavity for accommodating a magnetic circuit system and a vibrating system. Further, the magnetic circuit system includes a yoke 11, a magnet 12 bonded and fixed on the yoke, and a washer 13 covering the surface of the magnet 12. The vibrating system includes a vibrating diaphragm 7 and a voice coil 6 bonded with the vibrating diaphragm 7. The vibrating diaphragm 7 is fixed to the second housing 2 by a metal ring 10 which can support the vibrating diaphragm 7. In addition, in order to enhance the performance of the product at a high frequency, a central position of the vibrating diaphragm 7 is also coupled with a reinforcing part 9, and the reinforcing part 9 generally has a rigid composite layer structure.

As described above, in the magnetic circuit system, a certain distance is provided between a sidewall of the yoke 11 and the magnet 12 to form a magnetic gap, and the lower end of the voice coil 6 is disposed in the magnetic gap. The voice coil 6 also includes a voice coil lead 61, and the voice coil lead 61 is electrically connected with the electrical connection structure of the receiver.

Referring to FIG. 1, the first housing 1 and the second housing 2 of the receiver in the present invention are provided with electrical connection structures conductive with each other: a sidewall of the first housing 1 is provided with a first elastic piece 3, which is integrally injection molded with the first housing 1 in a specific implementation, and one end of the first elastic piece 3 is welded with a spring 5 electrically connected with an external circuit, and the other end is exposed at the outer side of the sidewall of the first housing 1; and similarly, a second elastic piece 4 is integrally injection molded on a sidewall of the second housing 2, on which a bonding pad 40 is disposed, and one end of the second elastic piece 4 is welded and fixed (usually spot-welded) with the voice coil lead 61 through the bonding pad 40, and the other end is exposed at the outer side of the sidewall of the second housing 2. In particular, the first elastic piece 3 includes a first connecting end 31 and a first exposed end 32, wherein the first connecting end 31 is welded to the spring 5 and the first exposed end 32 is the portion exposed at the outer side of the sidewall of the first housing 1. Similarly, the second elastic piece 4 specifically includes a second connecting end 41 and a second exposed end 42, wherein the second connecting end 41 is spot-welded with the voice coil lead 61, and the second exposed end 42 is the portion exposed at the outer side of the sidewall of the second housing 2.

As described above, the receiver of the present invention has the electrical connection structures including the first elastic piece 3, the second elastic piece 4 and the spring 5 connected to an external circuit. If the internal and external circuits are implemented to be conducted, the first elastic piece 3 and the second elastic piece 4 has to be electrically conducted. However, in the present embodiment, the first elastic piece 3 and the second elastic piece 4 are connected through a wire bonding process, that is, a bonding wire 320 is disposed on the first exposed end 32 of the first elastic piece 3, and the second exposed end 42 of the second elastic piece 4 is welded and conducted with the first exposed end 32 of the first elastic piece 3 by the bonding wire 320, thereby achieving the electrical connection of the first elastic piece 3 with the second elastic piece 4, completing the conduction between the internal and external circuits, and thus, the current signal of the external circuit is transmitted to the first elastic piece 3 and the second elastic piece 4 in sequence by the spring 5, and finally reaches the voice coil 6 which is spot-welded and fixed with the second elastic piece 4. After receiving the current signal, the voice coil 6 does a reciprocating motion of cutting magnetic force line under the action of the electromagnetic field, which drives the vibrating diaphragm 7 to vibrate, and then sound waves are radiated to the outer side, thereby completing the conversion from the electric energy to the acoustic energy.

Example 2

Figure 3:
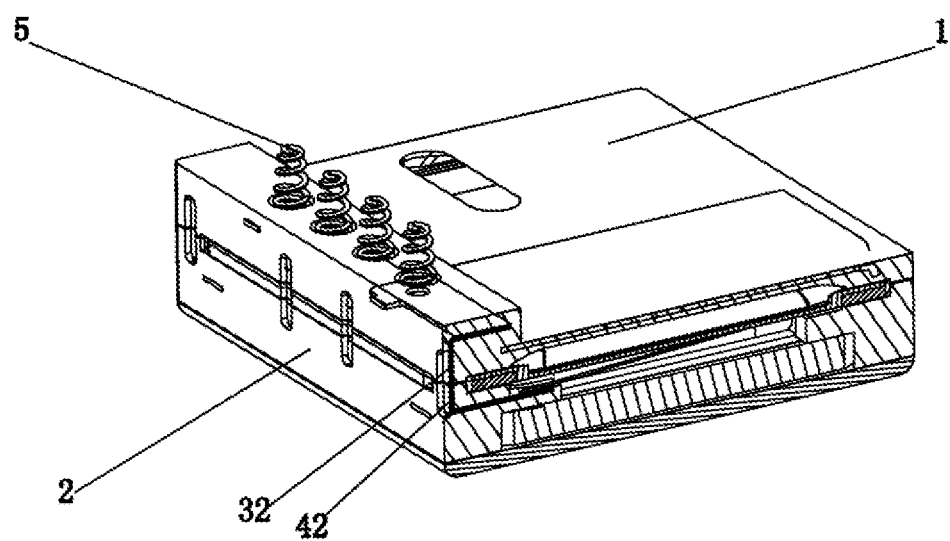
FIG. 3 is a perspective view of the structure of the receiver according to Example 2 of the present invention.

This embodiment is basically the same as that of Example 1 except that:

Referring to FIG. 3, in this embodiment, the conduct manner of the first elastic piece 3 with the second elastic piece 4 is different from that in Example 1. Specifically, the first exposed end 32 of the first elastic piece 3 and the second exposed end 42 of the second elastic piece 4 horizontally extend to the outer side of the sidewall of the first housing 3 and the outer side of the sidewall of the second housing 4, respectively. Further, the first exposed end 32 is bent in the direction toward the second housing 4 and tightly attached to the sidewall of the first housing 3, and correspondingly, the second exposed end 42 is bent in the direction toward the first housing 3 and can be lapped with the first exposed end 32, and the first exposed end 32 and the second exposed end 42 are fixed by laser-welding and are conductive with each other In the technical solution, since the vibrating diaphragm 7 is fixed on the second housing 2, that is, the vibrating system is accommodated in the cavity defined by the second housing 2, and the spring 5 is coupled to the first housing 3. In other words, in the present technical solution, the spring 5 is moved from the existing lateral position to the top of the vibrating system, i.e., the vertical position, which can avoid the phenomenon that the restrictive requirement for the lateral dimension can not be satisfied in the prior art due to the lateral space setting of the spring. Meanwhile, such structure design does not reduce the dimension of the vibrating system, and therefore, the overall acoustic performance of the product won't be affected.

Preferably, in order to facilitate the assembly, the first elastic piece 3 and the second elastic piece 4 are disposed on the sidewalls of the first housing 1 and the second housing 2 at a same end.

Preferably, the receiver of the present invention further comprises a hearing aid voice coil 14.

It should be noted that, the foregoing embodiment only shows a receiver with a single magnetic circuit structure. Actually, the implementation of the present technical solution is not limited to the product with such a magnetic circuit structure, and is also applicable to a receiver with other magnetic circuit structures such as a magnetic circuit structure simultaneously including two side magnets or four side magnets or the like, but not limited thereto.

The foregoing descriptions are merely exemplary embodiments of the present invention, but are not intended to limit the present invention. However, any equivalent modification or change made by those skilled in the art based on the present disclosure should fall within the protection scope of the claims.

The invention claimed is:

1. A receiver, comprising a peripheral housing, and a magnetic circuit system and a vibrating system which are accommodated in the peripheral housing, wherein the vibrating system comprises a vibrating diaphragm and a voice coil, the periphery housing comprises a first housing and a second housing matched with each other, and the first housing and the second housing are provided with electrical connection structures conductive with each other, wherein a first elastic piece is provided on a sidewall of the first housing, one end of the first elastic piece is welded with a spring electrically connected with an external circuit, and another end of the first elastic piece is exposed at an outer side of the sidewall of the first housing; and a second elastic piece is provided on a sidewall of the second housing, one end of the second elastic piece is electrically connected with a lead wire of the voice coil, and another end of the second elastic piece is exposed at an outer side of the sidewall of the second housing and is welded and fixed with a portion of the first elastic piece exposed at the outer side.

2. The receiver according to claim 1, wherein the vibrating system is accommodated in a cavity defined by the second housing, and the spring is coupled to the first housing and located above the vibrating system.

3. The receiver according to claim 1, wherein the first elastic piece comprises a first connecting end welded and fixed with the spring and a first exposed end exposed at an outer side of a sidewall of the first elastic piece, and the second elastic piece comprises a second connecting end electrically connected with the lead wire of the voice coil and a second exposed end exposed at an outer side of a sidewall of the second elastic piece.

4. The receiver according to claim 3, wherein a bonding wire is provided on the first exposed end, and the first exposed end and the second exposed end are welded and conducted by the bonding wire.

5. The receiver according to claim 3, wherein the first exposed end of the first elastic piece and the second exposed end of the second elastic piece extend horizontally to the outer side of the sidewall of the first housing and the outer side of the sidewall of the second housing of the receiver.

6. The receiver according to claim 5, wherein the first exposed end is bent in a direction toward the second housing and tightly attached to the sidewall of the first housing, and the second exposed end is correspondingly bent in a direction toward the first housing and lapped with the first exposed end.

7. The receiver according to claim 6, wherein the first exposed end and the second exposed end are fixed by laser-welding and are conductive with each other.

8. The receiver according to claim 1, wherein a pad is provided on the second elastic piece, and the lead wire of the voice coil is spot-welded and fixed to the pad.

9. The receiver according to claim 1, wherein the first elastic piece and the second elastic piece are disposed on sidewalls of the first housing and the second housing at a same end.

10. The receiver according to claim 1, further comprising a third housing and a hearing aid voice coil, wherein the third housing is matched with the second housing and coupled at a bottom of the second housing, a central position of the vibrating diaphragm is coupled with a reinforcing part, a lower side of the vibrating diaphragm is coupled with a metal ring supporting the vibrating diaphragm, and the magnetic circuit system comprises a yoke, and a magnet and a washer which are fixed in the yoke.

* * * * *